H. MUELLER.
COCK AND FAUCET.
APPLICATION FILED DEC. 1, 1908.
950,186.
Patented Feb. 22, 1910.
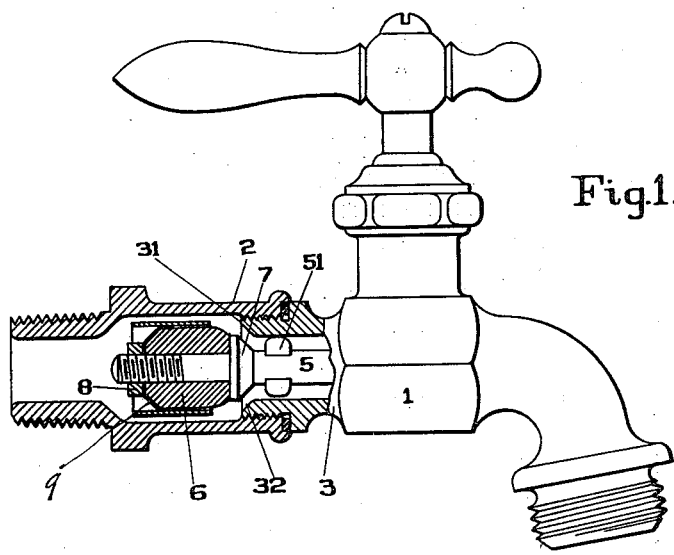
Fig. 1.
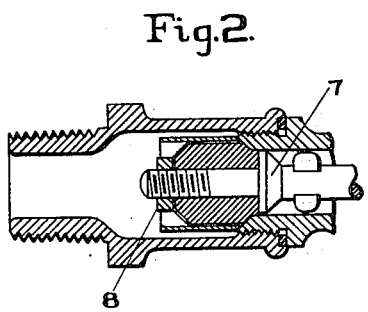
Fig. 2.
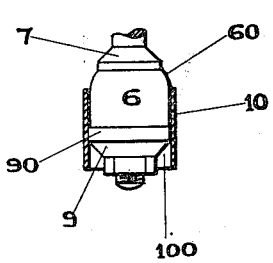
Fig. 3.
Fig. 4.
Fig. 5.
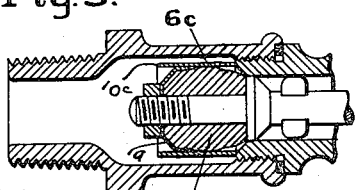
Fig. 6
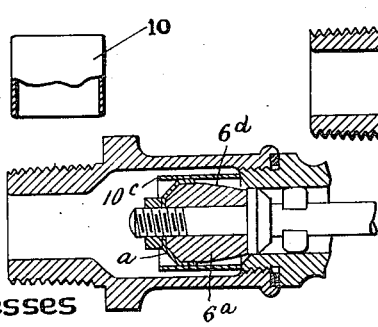
Witnesses
Chester W. Hathaway
Virginia Hamilton
Inventor:
Henry Mueller
by John L. Waddell
Attorney.

UNITED STATES PATENT OFFICE.

HENRY MUELLER, OF DECATUR, ILLINOIS, ASSIGNOR TO H. MUELLER MANUFACTURING COMPANY, OF DECATUR, ILLINOIS, A CORPORATION OF ILLINOIS.

COCK AND FAUCET.

950,186.  Specification of Letters Patent.  Patented Feb. 22, 1910.

Application filed December 1, 1908. Serial No. 465,520.

*To all whom it may concern:*

Be it known that I, HENRY MUELLER, a citizen of the United States, and resident of Decatur, Macon county, State of Illinois, have invented certain new and useful Improvements in Cocks and Faucets; and my preferred manner of carrying out the invention is set forth in the following full, clear, and exact description, terminating with claims particularly specifying the novelty.

This invention relates to water distribution, and more especially to cocks and faucets and reciprocating valves; and the object of the same is to protect the rubber ball of the Fuller cock against severe expansion and thus prolong its life regardless of the temperature of the liquid and the changes therein.

To this end the invention consists essentially of a brass thimble open at both ends, and fitting snugly over the flange of the shield which retains the ball in its place on the stem all as set forth in the following specification and illustrated in the drawing forming a part thereof.

Figure 1 is an elevation of a Fuller bib cock partly in section to show my invention with the valve open; Fig. 2 is a section through that part of the cock which contains the ball valve and the valve seat showing the valve completely closed; Fig. 3 is an elevation of the ball and a section of the thimble; and Fig. 4 is an elevation of the thimble partly in section. Figs. 5 and 6 are sectional views showing modifications.

The cock body 1 is here shown as of the Fuller type comprising two members of which the outer one 3 screws into the inner one 2 so as to leave a flat shoulder 31 projecting inwardly at the inner end of said outer member and a conical valve seat 32 at the inner corner of this shoulder, and the stem 5 leads from the usual crank or eccentric on the handle shaft through said member 3 (within which it may have lugs 51 to guide it in its motion) and through the Fuller ball 6, which latter is held in place between a collar 7 rigid with the stem and a nut 8 screwed onto the threaded extremity thereof as will be understood. Next inside said nut is a shell 9 whose conical body covers the end of the ball and is pressed against it by said nut, and the outer edge of this shell has a flange 90 closely surrounding the body of the ball where it is largest. From this point the ball preferably tapers slightly throughout its body, its front portion being rounded as at 60, and its front extremity being flat where it contacts with the collar 7. It will be clear that by turning the handle the rounded or tapered working end of the ball as 60 will be drawn against and compressed upon the valve seat 32 and project slightly into the bore of the member 3 so as to close the cock and shut off the flow of the liquid. In the forward movement of this ball the crank or eccentric on the handle shaft may cause the stem to swing slightly over a fulcrum formed by said lugs 51; but the elasticity of the working end of the ball will permit it to adapt itself to and press slightly through the valve seat 32 as seen in Fig. 2.

In the continued use of this faucet, the repeated compression of the working end of the ball will not only wear the latter, but in its use in hot water, the body is unduly expanded and often the ball is cut where it expands particularly under the free edge of 90 and in its general expansion it fills the ball chamber taking the life out of the rubber ball and in many instances, the expansion is so great that it chokes off the supply of water passing it toward the opening of the valve, and it is to provide against these contingencies that I have produced the following construction.

The numeral 10 designates a thimble which is simply a short section of tubing, preferably of brass, open at both ends, and of a bore which will fit snugly but not tightly around the flange 90 whereon it is retained by friction of the flange and ball. The presence of this thimble prevents undue expansion of the ball 6, yet the taper of the latter within the thimble causes it to possess all the requisites necessary to the successful operation of this device. The thimble also prevents the ball from contact upon and wear against the walls within the member 2. Its length relatively to that of the ball is about the proportion of that shown in the drawings, as also is its thickness. It may be slipped on manually, and may be removed or replaced at will.

In operation the cock stands with the valve open as shown in Fig. 1 and in closing the partition, assumes the position as shown in Fig. 2. As the ball moves forward it carries the thimble with it by the friction between them until the inner end of the thimble strikes the shoulder 31, when the flow of liquid is partly shut off by reason of the fact that the crank or eccentric on the handle shaft at this time occupies a somewhat lateral position and the thimble stands a little oblique to the axis of the body. Further movement of the handle shaft finally carries the parts to the position as shown in Fig. 2 where the stem stands at the axis of the cock body and during this movement the ball in its shell has been drawn forward within the thimble until the working end of the ball has entered the seat 32 and reliably and completely closed the cock.

A reverse movement of the parts obviously first carries them from the position shown in Fig. 2 to the rear, during which the valve will open quickly, and the ball and the thimble will leave the seat and shoulder simultaneously, and thereby assume the position as shown in Fig. 1. The fact that there is frictional contact between the rubber ball and thimble prevents the same from becoming accidentally lost during the movement of the stem there being nothing to impel it sliding too far forward although even if it did so it could be automatically replaced the first time the cock was closed.

It is understood that when the cock is first assembled the position of the thimble on the ball regardless of the shape of that ball is the same as shown at 10° in Fig. 5. After once completing the closure and resuming an open position, the thimble remains unmoved in the action of opening and closing the valve. The surface over which the thimble fits may be irregular as shown at 6° or may be tapered from any point within the shoulder of the attaching flange 9 as shown at 6ᵈ in Fig. 6, but in these modifications the ball 6ª will swell or expand until it fills the shell 10 more or less, either regular or irregular, depending upon such expansion and the thimble 10 performs the desired function.

As will be readily understood, the principal frictional engagement of the thimble 10 is had with the flange of the shell 9, the engagement of the soft ball with the thimble being provided by expanding the ball into engagement with the thimble. While this latter engagement is had, it will be readily understood that there would not be provided the sliding adjustment of the thimble relative to the ball unless the frictional engagement of the thimble and flange is provided, since the adjustment is produced by the contact of the forward end of the thimble with the seat, at which time the soft ball reaches its seat, and by reason of the pressure and the elasticity of the ball, causes the latter to expand, thereby increasing the friction; owing to the elasticity of the ball, the closing of the ball on its seat would simply provide for yielding of the thimble in place of an actual change in relative position such as provided by an adjustment, thereby not only providing for excessive wear on the forward end of the thimble, but in addition causing a tendency to wear the periphery of the ball by reason of the constant tendency of the thimble to move on the ball and which tendency is resisted by the expanding of the ball within the thimble. By reason of the frictional contact of the thimble and flange, however, any yielding movement of the thimble due to contact of the thimble with the seat, would cause a change in relative position of thimble and flange, and this position would be retained when the valve is released, since the release of the ball would tend to reduce the expansion and decrease the friction between the ball and thimble without affecting the frictional engagement of the thimble and flange, so that as wear on the ball is provided by continual use, the thimble gradually recedes rearwardly to compensate for this wear and without continually placing excess pressure on the seat at the front end of the thimble.

What I claim as new is:

1. In a liquid shut off, the combination with a cock body having an integral shoulder and a concentric valve seat, and a soft ball valve movable away from said seat and to and partly into it; of a stem for the valve, a shell covering the rear end of the valve and provided with an annular flange around its largest portion, and a cylindrical thimble fitting snugly but slidably around said flange to provide a frictional engagement therebetween and of a length to contact with said shoulder when valve is completely closed.

2. In a liquid shut off, the combination with a cock body having an internal shoulder and a concentric valve seat, and a soft valve movable away from said seat and to and partly into it; of a stem for the valve, a shell having a conical body covering the rear end of the valve and provided with an annular flange, and a thimble fitting snugly but slidably around said flange to provide a frictional engagement therebetween and of a length to contact with said shoulder when valve is completely closed.

3. In a liquid shut off, the combination with a cock body having an internal shoulder and a concentric valve seat, and a soft valve movable away from said seat and to and partly into it; of a valve stem having a collar at the front end of the valve, a shell covering the rear end of the valve and provided with an annular flange, a nut on the stem in rear of said shell, and a cylindrical thimble fitting snugly but slidably around said flange to provide a frictional engagement therebetween and of a length to contact with said shoulder when valve is completely closed.

4. In a liquid shut off, the combination with a cock body having an internal shoulder and a valve seat, and a soft valve movable toward and away from said seat; of a stem for the valve having a collar at the front end of the latter, a shell having a conical body covering the rear end of the valve and provided with an annular flange, a nut on the stem in rear of said shell, and a cylindrical thimble open at both ends, fitting snugly but slidably around said flange to provide a frictional engagement therebetween, and of a length to contact with said shoulder when valve is completely closed.

5. In a liquid shut off, the combination with a cock body having a valve seat, and a soft ball valve movable toward and away from said seat; of a stem passing centrally through the valve, means for holding the latter thereon, and a thimble surrounding the valve and frictionally engaged with and slidable longitudinally of said means, the thimble being of a length to contact with the seat after the working end of the ball engages it and the valve is closed.

6. In a liquid shut off, the combination with a cock body having a valve seat, and a soft valve tapering slightly toward its working end and movable toward and away from said seat; of a stem engaging the valve, means for holding the latter thereon, and a thimble surrounding the valve and frictionally engaged with and slidable longitudinally of said means, the thimble being of a length to contact with the seat after the working end of the valve engages it and to project beyond the rear of the valve when the latter is completely seated.

7. In a liquid shut-off, the combination with a cock body having a valve seat, and an elastic valve adapted to coöperate with said seat to control the flow of liquid through the cock, of a valve-retaining instrumentality for said valve, said instrumentality comprising a member carried by the valve stem and having an annular flange, and a thimble carried by and frictionally engaged with said flange, whereby said member and flange are relatively movable longitudinally of the valve stem under pressure exerted axially of the thimble.

8. In a liquid shut off, the combination with a cock body having a valve seat, and an elastic valve adapted to coöperate with said seat to control the flow of liquid through the cock, of a valve-retaining instrumentality for said valve, said instrumentality comprising a member carried by the valve stem and having an annular flange, and a thimble carried by and frictionally engaged with said flange, whereby said member and flange are relatively movable longitudinally of the valve stem under pressure exerted axially of the thimble, the frictional engagement of the flange and thimble permitting axial adjustment of the thimble automatically under the action of wear to the elastic valve.

In testimony whereof, I have hereunto subscribed my signature, this 22nd day of September A. D. 1908.

HENRY MUELLER.

Witnesses:
VIRGINIA HAMILTON,
JOHN L. WADDELL.